US010785801B2

(12) United States Patent
Li et al.

(10) Patent No.: US 10,785,801 B2
(45) Date of Patent: Sep. 22, 2020

(54) METHOD AND APPARATUS FOR RANDOM ACCESS IN A WIRELESS COMMUNICATION SYSTEM

(71) Applicant: Telefonaktiebolaget LM Ericsson (publ), Stockholm (SE)

(72) Inventors: Gen Li, Beijing (CN); Jinhua Liu, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 48 days.

(21) Appl. No.: 15/759,204

(22) PCT Filed: Jan. 2, 2018

(86) PCT No.: PCT/CN2018/070057
§ 371 (c)(1),
(2) Date: Mar. 9, 2018

(87) PCT Pub. No.: WO2018/127042
PCT Pub. Date: Jul. 12, 2018

(65) Prior Publication Data
US 2019/0075598 A1    Mar. 7, 2019

(30) Foreign Application Priority Data

Jan. 5, 2017  (WO) ............... PCT/CN2017/070271

(51) Int. Cl.
*H04W 74/08*      (2009.01)
*H04W 76/11*      (2018.01)
(Continued)

(52) U.S. Cl.
CPC ....... *H04W 74/0833* (2013.01); *H04W 72/14* (2013.01); *H04W 74/04* (2013.01);
(Continued)

(58) Field of Classification Search
CPC ....... H04W 74/00–0891; H04W 74/02; H04W 74/0833; H04W 74/04
See application file for complete search history.

(56) References Cited

U.S. PATENT DOCUMENTS

2017/0135115 A1*  5/2017  Cho ......................... H04L 1/00
2017/0257891 A1*  9/2017  Lindoff ............. H04W 74/0833
(Continued)

FOREIGN PATENT DOCUMENTS

CN        101882975 A    11/2010
CN        102231917 A    11/2011
(Continued)

OTHER PUBLICATIONS

Ericsson, "Random Access Enhancements," 3GPP TSG-RAN WG2 #95bis, Oct. 10-14, 2016, Tdoc R2-166826, 5 pages.
(Continued)

*Primary Examiner* — Marcus Smith
(74) *Attorney, Agent, or Firm* — NDWE LLP

(57) ABSTRACT

Methods, apparatuses and computer program provide for random access in a wireless communication system. A method implemented in a network device comprises receiving, from a terminal device, a signal for initiating an RA procedure of a first RA type, the signal including a preamble portion and an information portion. In response to successfully detecting the preamble portion of the signal, but failure in detection of the information portion of the signal, transmitting to the terminal device a first response indicating a successful detection of only a preamble portion of the signal, or a second response indicating an RA procedure of a second RA type different from the first RA type. The described technique may increase the reliability of a two-step RACH procedure and/or reduce consumption of time-frequency resources.

15 Claims, 11 Drawing Sheets

(51) Int. Cl.
*H04W 74/04* (2009.01)
*H04W 72/14* (2009.01)
*H04W 88/02* (2009.01)

(52) U.S. Cl.
CPC .......... *H04W 76/11* (2018.02); *H04W 88/023* (2013.01); *H04W 74/0866* (2013.01)

(56) References Cited

U.S. PATENT DOCUMENTS

| | | | | |
|---|---|---|---|---|
| 2017/0332417 | A1* | 11/2017 | Tenny | H04W 16/28 |
| 2018/0109976 | A1* | 4/2018 | Ly | H04L 5/0053 |
| 2018/0220452 | A1* | 8/2018 | Sivanesan | H04W 74/085 |
| 2019/0320467 | A1* | 10/2019 | Freda | H04L 5/0055 |

FOREIGN PATENT DOCUMENTS

| | | |
|---|---|---|
| WO | 2012058974 A1 | 5/2012 |
| WO | 2015/137632 A1 | 9/2015 |

OTHER PUBLICATIONS

Ericsson, "Random Access Enhancements," 3GPP TSG-RAN WG2 #96, Nov. 14-18, 2016, Tdoc R2-168665, 5 pages.
International Search Report and Written Opinion for Application No. PCT/CN2018/070057, dated Mar. 27, 2018, 8 pages.
International Preliminary Report on Patentability for Application No. PCT/CN2018/070057, dated Jul. 18, 2019, 6 pages.
Extended European Search Report, Application No. EP18736086.2, dated May 18, 2020, 11 pages.
Intel Corporation, "2-Step random access procedure in NR", 3GPP TSG-RAN WG2 #96, R2-168520, Nov. 14-18, 2016, 4 pages.

* cited by examiner

METHOD AND APPARATUS FOR RANDOM ACCESS IN A WIRELESS COMMUNICATION SYSTEM

CROSS-REFERENCE TO RELATED APPLICATIONS

This application is a National stage of International Application No. PCT/CN2018/070057, filed Jan. 2, 2018, which claims priority to International Application No. PCT/CN2017/070271, filed Jan. 5, 2017, which are hereby incorporated by reference.

TECHNICAL FIELD

The non-limiting and example embodiments of the present disclosure generally relate to a technical field of wireless communication, and specifically to methods, apparatuses and computer programs for random access in a wireless communication system.

BACKGROUND

This section introduces aspects that may facilitate a better understanding of the disclosure. Accordingly, the statements of this section are to be read in this light and are not to be understood as admissions about what is in the prior art or what is not in the prior art.

In wireless communication systems, a terminal device has to setup a connection with a network node before transmitting any data to the network node. A procedure for a terminal device to request a connection setup is commonly referred to as random access. A terminal device may perform the random access on a carrier on which it determines to camp based on a result of cell search. The random access may be performed either using a contention based scheme which requires a terminal device to select a resource for the random access from a shared resource pool or a contention-free scheme which allows the terminal device to perform the random access using an assigned dedicated resource. A contention based scheme requires a mechanism for a network node to resolve any contention due to multiple terminals trying to access the network using a same random-access resource.

In a Long Term Evolution (LTE) system developed by the Third Generation Partnership Project (3GPP), a four-step random access procedure is specified, however, such a four-step random access procedure may not be able to meet low latency requirement of some services to be supported in a future wireless system, for example, a fifth generation (5G) system or a New Radio (NR) system.

SUMMARY

In order to solve at least part of problems in a conventional random access procedure, an efficient random access procedure for the NR system is desired. To this end, methods, apparatuses and computer programs are provided in the present disclosure. It will be appreciated that embodiments of the present disclosure are not limited to a NR system, but could be more widely applied to any wireless communication system where similar problems exist.

Various embodiments of the present disclosure mainly aim at providing methods, apparatuses and computer programs for random access. Other features and advantages of embodiments of the present disclosure will be understood from the following description of specific embodiments when read in conjunction with the accompanying drawings, which illustrate, by way of example, the principles of embodiments of the present disclosure.

In a first aspect of the disclosure, there is provided a method implemented in a network device. The method comprises: receiving, from a terminal device, a signal for initiating an RA procedure of a first RA type, the signal including a preamble portion and an information portion; and in response to successfully detecting the preamble portion of the signal but failure in detection of the information portion of the signal (which may be indicated by, e.g., a nonzero result of the Cyclic Redundancy Check (CRC) for the decoded information), transmitting one of the following to the terminal device: a first response indicating a successful detection of only a preamble portion of the signal, and a second response indicating an RA procedure of a second RA type different from the first RA type. In one embodiment, the first RA type may include a two-step RA, and the second RA type may include a four-step RA.

In another embodiment, the method may further comprise: in response to a successful detection of both the preamble portion and the information portion of the signal, transmitting one of the following to the terminal device: a third response indicating a successful detection of the signal, and a fourth response indicating an RA procedure of the first RA type.

In some embodiments, the network device may receive the signal by: detecting the preamble portion of the signal; and in response to the preamble portion being detected in a resource separate from a resource pool for a random access procedure of the second RA type, decoding the information portion of the signal.

In an embodiment, the network device may receive the signal for initiating a random access procedure of a first RA type by: detecting the preamble portion of the signal; and in response to detecting that the detected preamble is from a set of preambles associated with the first RA type, decoding the information portion of the signal.

In another embodiment, the method may further comprise: transmitting, to the terminal device, information indicating at least one of: a radio resource for the RA procedure of the first RA type, a set of preambles for the RA procedure of the first RA type, a radio resource for a random access procedure of the second RA type, a set of preambles for a random access procedure of the second RA type, a configuration on a switching from the RA procedure of the first RA type to an RA procedure of the second RA type. In a further embodiment, the configuration may indicate at least one of: whether the switching is supported, and a mode of the switching. In some embodiments, the mode of the switching may include one of: a switching initiated by the terminal device, a switching initiated by the network device.

In a second aspect of the disclosure, there is provided a method implemented at a terminal device. The method includes: transmitting a signal to a network device to initiate an RA procedure of a first RA type, the signal including a preamble portion and an information portion; and switching to an RA procedure of the second RA type of a second RA type different from the first RA type in response to an absence of a response from the network device indicating a successful detection of both the preamble portion and the information portion of the signal. In an embodiment, the first RA type may include a two-step RA, and the second RA type includes a four-step RA.

In one embodiment, the terminal device may switch to the RA procedure of the second RA type in response to an absence of a response from the network device indicating a successful detection of both the preamble portion and the information portion of the signal by: transmitting a preamble to the network device to initiate the RA procedure of the second RA type in response to an absence of a response to the signal from the network device.

In another embodiment, the terminal device may switch to the RA procedure of the second RA type in response to an absence of a response from the network device indicating a successful detection of both the preamble portion and the information portion of the signal by: determining from the received response as to whether only a preamble portion of the signal is successfully detected; and in response to determining that only the preamble portion of the signal is successfully detected, transmitting another signal including data (or in other words, information) to the network device as a part of the RA procedure of the second RA type. In one embodiment, the determination as to whether only a preamble portion of the signal is successfully detected may be based on at least one of: an indicator included in the received response, an indicator included in a scheduling grant associated with the received response, a transmission format of the received response, a size of a resource granted by the received response, and a resource on which the response is received.

In still another embodiment, switching to the RA procedure of the second RA type may include: switching to the RA procedure of the second RA type further in response to the number of attempts for initiating an RA procedure of the first RA type exceeding a threshold.

In some embodiments, the method may further include: receiving, from the network device, information on a configuration of the switching from RA procedure to the RA procedure of the second RA type; and wherein switching to the RA procedure of the second RA type may include: switching to the RA procedure of the second RA type according to the configuration. In an embodiment, the information on the configuration indicates at least one of: whether the switching is supported, and a mode of the switching. In a further embodiment, the mode of the switching may include one of: a switching initiated by the terminal device, a switching initiated by the network device.

In an embodiment, transmitting the signal to the network device to initiate the RA procedure may include: transmitting the signal using a resource at least partially overlapping with a resource pool associated with the second RA type. In another embodiment, the terminal device may transmit the signal using a resource at least partially overlapping with a resource pool associated with the second RA type by: transmitting the preamble portion of the signal using a first resource overlapping with the resource pool; and transmitting the information portion of the signal using a second resource separate from the resource pool.

In another embodiment, the terminal device may transmit the signal to the network device to initiate the RA procedure by: transmitting the signal using a resource separate from a resource pool associated with the second RA type.

In still another embodiment, the terminal device may transmit the signal to the network device to initiate the RA procedure by: transmitting data (or, in other words, information) and a preamble selected from a first set of preambles for the first RA type, the first set of preambles being disjoint from a second set of preambles for the second RA type.

In a third aspect of the disclosure, there is provided a network device. The network device may include a receiving unit, configured to receive, from a terminal device, a signal for initiating an RA procedure of a first RA type, the signal including a preamble portion and an information portion; and a first transmitting unit configured to transmit one of the following to the terminal device in response to successfully detecting the preamble portion of the signal but failure in detection of the information portion of the signal: a first response indicating a successful detection of only a preamble portion of the signal, and a second response indicating an RA procedure of a second RA type different from the first RA type.

In a fourth aspect of the disclosure, there is provided a terminal device. The terminal device includes a transmitting unit, configured to transmit a signal to a network device to initiate an RA procedure of a first RA type, the signal including a preamble portion and an information portion; and an RA procedure switching unit, configured to switch to an RA procedure of the second RA type of a second RA type different from the first RA type in response to an absence of a response from the network device indicating a successful detection of both the preamble portion and the information portion of the signal.

In a fifth aspect of the disclosure, there is provided a network device. The network device includes a processor and a memory, said memory containing instructions executable by said processor, and said processor being configured to cause the network device to perform a method according the first aspect of the present disclosure.

In a sixth aspect of the disclosure, there is provided a terminal device. The terminal device includes a processor and a memory, said memory containing instructions executable by said processor and said processor being configured to cause the terminal device to perform a method according the second aspect of the present disclosure.

In a seventh aspect of the disclosure, there is provided a computer program, comprising instructions which, when executed on one or more processors, cause the one or more processors to carry out a method according to the first aspect of the present disclosure.

In an eighth aspect of the disclosure, there is provided a computer program, comprising instructions which, when executed on one or more processors, cause the one or more processors to carry out a method according to the second aspect of the present disclosure.

In a ninth aspect of the disclosure, there is provided an apparatus in a network device, the apparatus comprising processing means adapted to perform a method according the first aspect of the present disclosure.

In a tenth aspect of the disclosure, there is provided an apparatus in a terminal device, the apparatus comprising processing means adapted to perform a method according the second aspect of the present disclosure.

According to the various aspects and embodiments as mentioned above, reliability of random access may be increased, and latency of the random access may be reduced.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
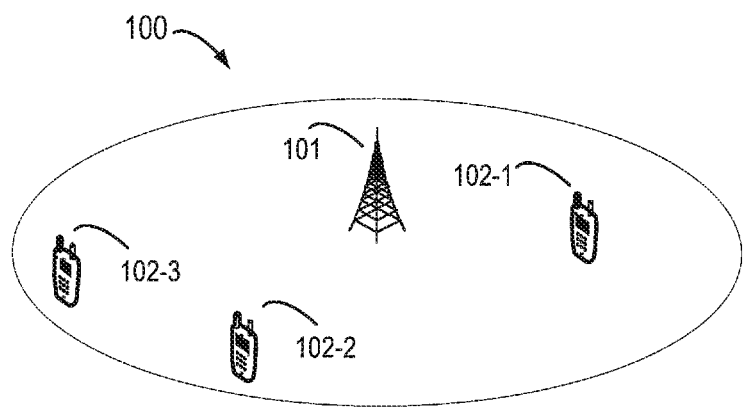
FIG. 1 illustrates an example wireless communication network in which embodiments of the present disclosure may be implemented.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as NR, LTE-Advanced (LTE-A), LTE, Wideband Code Division Multiple Access (WCDMA), High-Speed Packet Access (HSPA), and so on. Furthermore, the communications between network devices and between a network device and a terminal device in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, the NR communication protocols, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that can access a wireless communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably.

FIG. 1 illustrates an example wireless communication network 100 in which embodiments of the disclosure may be implemented. As shown in FIG. 1, the wireless communication network 100 may include one or more network devices, for example network devices 101, which may be in a form of an eNB or gNB. It will be appreciated that the network device 101 could also be in a form of a Node B, BTS (Base Transceiver Station), and/or BSS (Base Station Subsystem), access point (AP) and the like. The network device 101 may provide radio connectivity to a set of terminal devices or UEs 102-1, 102-2, . . . , 102-N (collectively referred to as "terminal device(s) 102") within its coverage, where N is a natural number. A downlink (DL) transmission herein refers to a transmission from the network device to a terminal device, and an uplink (UL) transmission refers to a transmission in an opposite direction.

Figure 2:
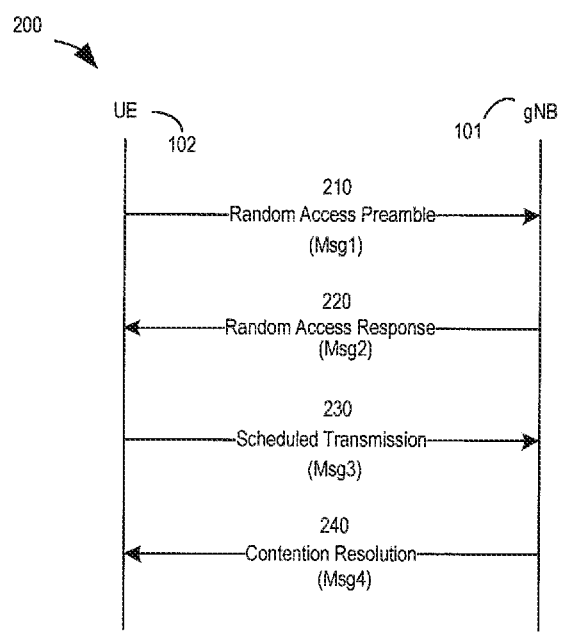
FIG. 2 illustrates a procedure of a conventional four-step random access.

Before transmitting any data or a control signal in the UL to the network device 101, a terminal device 102 needs to perform a random access procedure. FIG. 2 illustrates a four-step contention-based random access procedure 200 as specified in a LTE system.

Figure 3:
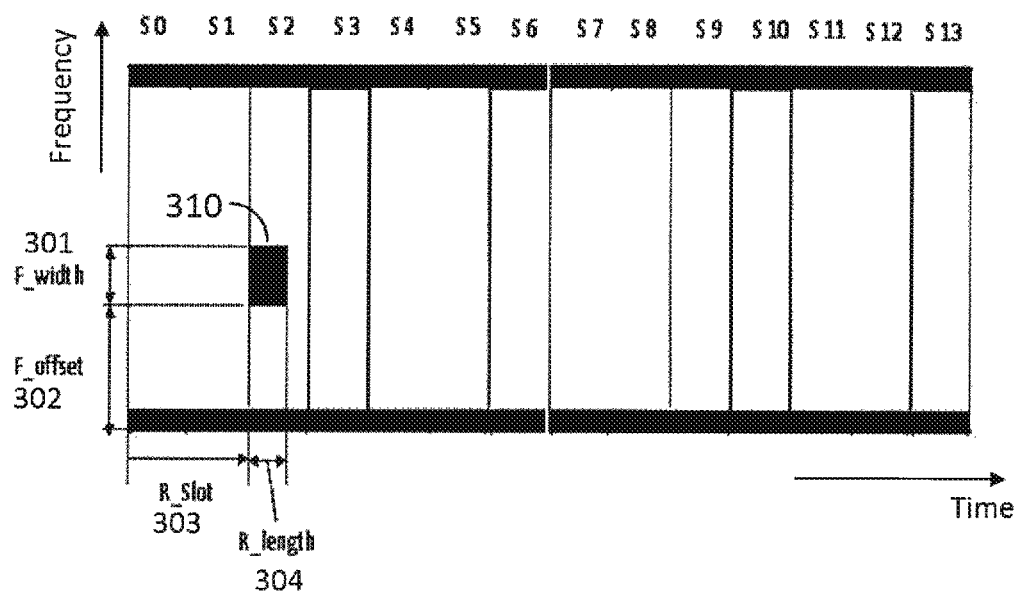
FIG. 3 illustrates a resource for transmission of a random access preamble.

As shown in FIG. 2, at 210, a terminal device (e.g., the UE 102) transmits a random access preamble (also referred to as a physical random access channel (PRACH) preamble, a preamble, an RACH request, or Msg1) to a network device (e.g., the network device 101), which allows the network device to estimate a transmission timing of the terminal device thereby facilitating uplink synchronization of the terminal device. The uplink synchronization is necessary for the terminal device to transmit in the UL. The random access preamble is associated with a Random Access Radio Network Temporary Identity (RA-RNTI) tier identifying the terminal device. Transmission of the random access preamble may use a resource 310 shown in FIG. 3. The resource 310 may be determined based on a set of parameters including F_width 301, F_offset 302, R_Slot 303 and R_length 304. Value of the parameter R_Slot 303 is determined by PRACH Configuration Index and value of the parameter R_length 304 is determined by a preamble format. In addition, the parameter F_offset 302 is a physical resource block number configured by a higher layer. S0, S1, . . . , and S13 each denotes an index of a slot. More details on these parameters and theirs values may be found, for example, in 3GPP TS 36.211, v.xx Section 5.7 Physical random access channel.

Referring back to FIG. 2, at 220, in response to receiving the random access preamble, the network device 101 transmits, to the terminal device 102, a random access response (RAR) message (also referred to as Msg2) carrying a timing advance (TA) command to adjust the UL transmission timing of the terminal device based on the timing estimated at 210. The Msg2 is transmitted with the RA-RNTI of the terminal device. In addition to transmitting the TA command to the terminal device for establishing the uplink synchronization, at 220, the network device 101 also assigns an uplink resource and a temporary Temporary Cell Radio Network Temporary Identity (T-CRNTI) via the RAR message to the terminal device for the terminal device to transmit at step 230 in the UL.

At 230, the terminal device 102 transmits, to the network device 101, a message 3 (also referred to as Msg3) with the T-CRNTI it obtained from the RAR message, using the resource assigned/scheduled by the network device 101 at 220. The transmission uses an UL shared channel (UL-SCH) similar to normal scheduled data transmission. The Msg 3 may include a radio resource control (RRC) connection request, and exact content of the Msg3 depends on a state of the terminal device, for example depends on whether the terminal device is previously known to the network or not.

At 240, in response to the received Msg3, the network device 101 transmits a contention-resolution message (also referred to as Msg4) to the terminal device via DL shared channel (DL-SCH). The Msg4 may include a RRC connection setup message and a CRNTI for the terminal device. As such, contention can be resolved due to multiple terminals (e.g., terminal devices 102 and 103) trying to access the system using a same random-access resource. After 240, the terminal device 102 can use the CRNTI for communication with the network device 101.

A random access procedure is also considered important for a NR system being developed currently in 3GPP, and design of the random access procedure for the NR system is a hot topic being discussed in 3GPP. It has been agreed in 3GPP Radio Access Network 1 (RAN1) meeting that at least a similar four-step random access procedure as that specified in LTE and shown in FIG. 2 is to be supported in the NR system. Besides the four-step random access procedure, a two-step random access procedure 400 as shown in FIG. 4 is also discussed for enabling low latency and small overhead for some specific use cases.

Figure 4:
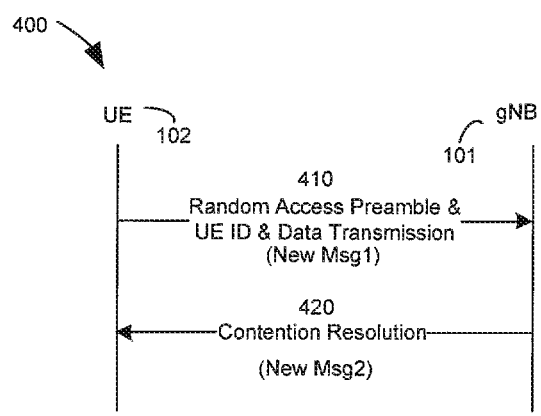
FIG. 4 illustrates an example of a two-step random access procedure.

For the two-step approach as shown in FIG. 4, the network device 101 may configure, for example via a system information signaling, resources for PRACH preamble and resources for contention based data that may be associated with one or multiple PRACH preambles.

As shown in FIG. 4, at 410, a terminal device (e.g., the UE 102 shown in FIG. 1) may transmit a PRACH preamble and a data transmission in an associated data resource. Similar to the Msg3 transmitted by the terminal device at 230 of the four-step approach shown in FIG. 2, the data transmission performed at 410 contains information for identifying the terminal device, for example by means of a UE identity (UE ID). A combination of the PRACH preamble and the data transmitted at step 410 may be referred to as a new message 1 (Msg 1) which contains a preamble portion and an information portion. In one embodiment, the new Msg 1 may include the Msg 1 and Msg 3 transmitted at 210 and 230 of FIG. 2.

Similar to 240 of FIG. 2, at 420 of FIG. 4, the network device 101 transmits a Contention Resolution message identifying a specific terminal device, in response to decoding successfully the information portion of new message 1 containing a UE ID. The message transmitted at 420 may be referred to as new Msg2. In principle, the two-step random access approach 400 shown in FIG. 4 may pare down the round trip time (RTT) required for the network device 101 (which may be a gNB or a TRP in the NR system) to transmit an RAR message and the terminal device to transmit a Msg3, and consequently reduce the latency of the random access (RA) procedure.

The 3GPP agreements on the two-step random access procedure are listed as below:

The two-step RACH resources are optionally configurable by the network (NW), and whether it can be configured by broadcast and/or by dedicated signaling is for further study (FFS);

The NW can configure/restrict the usage of the two-step RACH for certain cases (e.g. procedures/services/radio condition, etc.), and the exact cases for which to configure/restrict the usage of the two-step procedure is FFS;

RAN2 expects a benefit in latency for the two step RACH procedure;

From RAN2 point of view, the two-step RACH procedure is not restricted to be used with certain UE ID size.

As mentioned above, the two-step RACH procedure as shown in FIG. 4 may reduce latency of the RA procedure, and therefore it is very promising to be used at least for delay sensitive services. For example, the two-step RACH procedure may be configured in certain use cases for certain UEs (for example, UEs with small TA, or UEs whose TA is already known to the network device). However, inventors of the present disclosure have observed that since the information portion of the new Msg 1 is transmitted without a TA adjustment, a drawback of the two-step procedure lies in potential higher decoding error of the information portion of the new Msg 1 transmitted at 410. In this case, the terminal device configured with the two-step RACH procedure may encounter relatively higher probability for random access failure. Therefore, it is valuable and desirable to develop a solution for reducing the radio access failure of terminal devices configured with the two-step RA procedure.

In order to solve at least part of the above problems, methods, apparatuses and computer programs have been proposed herein. Some embodiments of the present disclosure provide an enhancement to the two-step RACH procedure in order to increase the reliability of two-step RACH procedure and/or reduce consumption of time-frequency resources. One of the key ideas as proposed herein is that a network device and/or a terminal device may fall back to a four-step RA procedure in response to failure of the two-step RA in a smart way. However, it should be appreciated that embodiments of the disclosure are not limited to a NR system, but could be more widely applied to any wireless communication systems where similar problem exists. For example, some embodiments may be applied to a wireless system supporting more than one (for example, two or more) type of random access (RA) procedures (including for example, but not limited to, a four-step RA procedure and a two-step RA procedure shown in FIGS. 2 and 4 respectively), and in case random access failure occurs for a terminal device configured with one type of RA procedure, the terminal device and/or the network device may switch/fall back to another type of RA procedure.

Figure 5A:
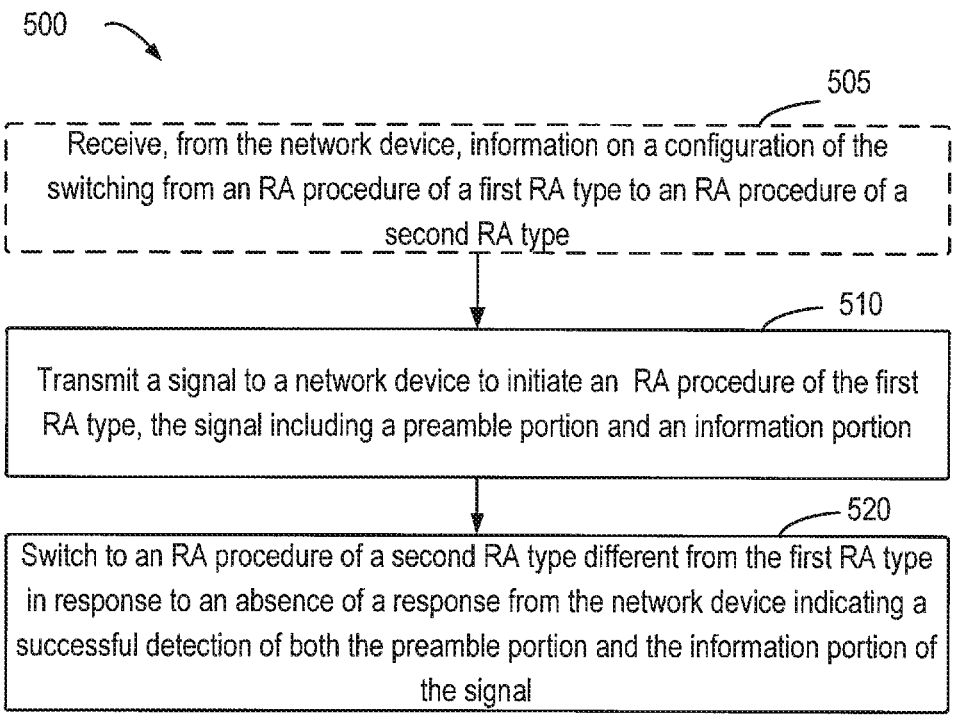
FIGS. 5A-5D illustrate flowcharts of a method implemented at a terminal device according to an embodiment of the present disclosure.

Reference is now made to FIG. 5A which shows a flowchart of a method 500 implemented in a terminal device according to an embodiment of the present disclosure. For ease of discussions, the method 500 will be described below with reference to the environment as described with reference to FIG. 1.

As illustrated in FIG. 5A, at block 510, the terminal device 102 transmits a signal to the network device 101 to initiate an RA procedure of a first RA type. The random access procedure of the first RA type may be a two-step RA procedure similar to that shown in FIG. 4. However, it is to be understood that embodiments are not limited thereto. For example, in another embodiment, the RA procedure of the first RA type may include more or less or different signaling/operations than that shown in FIG. 4, and the exact signaling/operations involved in the RA procedure of the first RA type may vary depending on wireless systems to which embodiments of the present disclosure are applied.

In one embodiment, the network device 101 may support both the first RA type (for example, a two-step RA) and a second RA type (for example, a four-step RA). In addition, time-frequency resources configured for the first RA type may partially or fully overlap with the time-frequency resource configured for the second RA type. Accordingly, in one embodiment, at block 510, the terminal device 102 may transmit the signal using a resource at least partially overlapping with a resource pool associated with the second RA type (for example, a resource pool configured for the second RA type for transmission of a signal (such as a preamble) to initiate an RA procedure of the second RA type).

In one embodiment, the signal may include a preamble portion and an information portion. In another embodiment, the signal may be similar to the new Msg 1 as shown in FIG. 4. That is, the signal may carry additional information beside a PRACH preamble. In both embodiments, transmission of the signal may require more resource than that required for transmitting a conventional Msg 1 of a four-step RA procedure as shown in FIG. 2 which includes only a preamble. Therefore, in some embodiments, more resource may be configured for the two-step RA procedure for transmitting the new Msg 1.

Figure 6A:
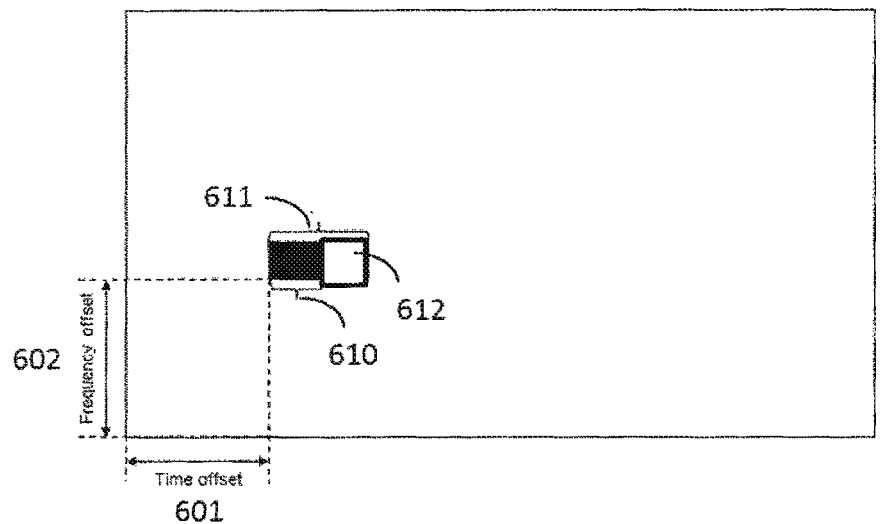
FIGS. 6A-6B illustrate example of resource allocation for random access according to embodiments of the present disclosure.

Just for illustration, an example of overlapping resource allocations for the first RA type (for example, a two-step RA) and the second RA type (for example, a four-step RA) is shown in FIG. 6A. It should be appreciated that embodiments of the present disclosure are not limited to the specific resource allocation shown here. In the example of FIG. 6A, a resource 611 is configured for the first RA type for transmitting the new Msg 1. In one embodiment, the resource 611 may include a resource pool 610 for PRACH preamble transmission and another resource pool 612 for message/data transmission. In the example shown in FIG. 6A, the resource pool 610 is also configured for the second RA type for transmitting Msg 1. Therefore, in this example, both the resource configured for the two-step RA and the resource configured for the four-step RA may start from a same position defined by a time offset 601 and a frequency offset 602.

Figure 5B:
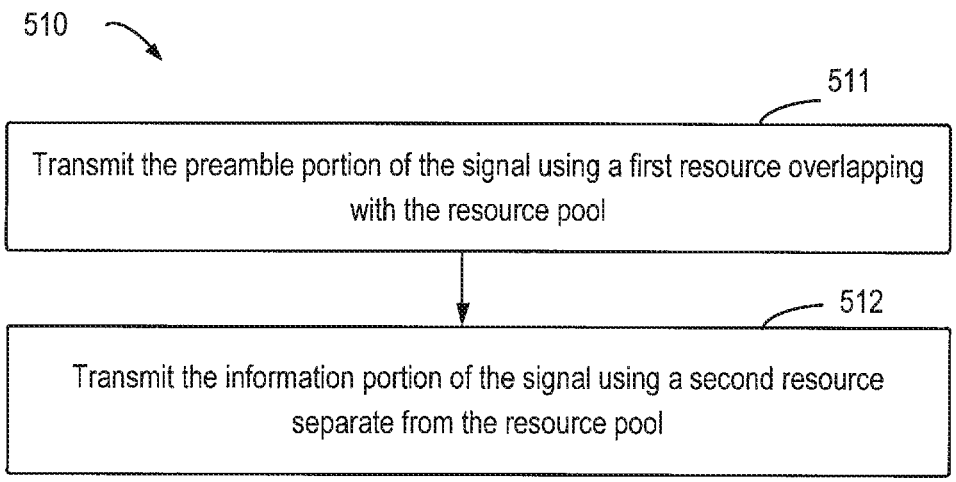

FIG. 5B illustrates an example implementation of block 510. As shown, at block 511, the terminal device 102 may transmit the signal by transmitting the preamble portion of the signal using a first resource (for example, a resource from the resource pool 610 shown in FIG. 6A) overlapping with the resource pool associated with the second RA type At block 512, the terminal device 102 may transmit the information portion of the signal using a second resource (for example, a resource from the resource pool 612 shown in FIG. 6A) separate from the resource pool 610 associated with the second RA type. This embodiment allows the preamble portion of the new Msg 1 of the two-step RA procedure and the preamble of the conventional Msg 1 of a four-step RA procedure to share same time-frequency resource.

Figure 6B:
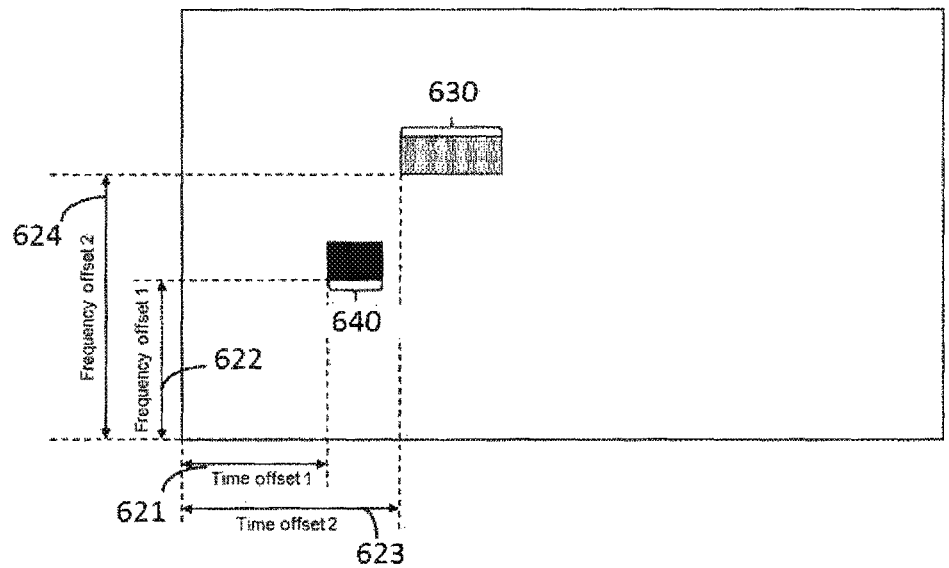

In another embodiment, separate/disjoint time-frequency resources may be configured for the first RA type and the second RA type, in order for the network device to identify a type of the RA procedure from the resource. An example for separate resource allocations for the first RA type and the second RA type is illustrated in FIG. 6B. In this example, resource 640 configured for the first RA type may start from a position defined by a first time offset 621 and a first frequency offset 622, and the resource 630 configured for the second RA type may start from a position defined by a second time offset 623 and a second frequency offset 624. Accordingly, in one embodiment, at block 510 of FIG. 5A, the terminal device 102 may transmit the signal using a resource separate from the resource pool 630 associated with the second RA type (for example a resource pool for transmission of a preamble to initiate a random access procedure of the second RA type).

In some embodiments, a first set of PRACH preamble sequences and a second set of PRACH preamble sequences may be configured for the first RA type and the second RA type, respectively. In a further embodiment, the first set of PRACH preamble sequences may be disjoint from the second set of PRACH preamble sequences, in order for a network device to identify a type of the RA procedure based on received preamble. For example, 40 out of the total 60 preambles may be configured for a four-step RA while the remaining 20 preambles of the total 60 preambles may be configured for a two-step RA.

That is to say, in some embodiments, at block 510 of FIG. 5A, the terminal device 102 may transmit a preamble selected from a first set of preambles for the random access procedure of the first RA type, and the first set of preambles is disjoint from a second set of preambles for the second RA type. The terminal device 102 may also transmit an information portion included in the signal at block 510. It should be appreciated that the number of preambles for the RA procedure of the first RA type (for example, a two-step RA procedure) and the RA procedure of the second RA type (for example, a four-step RA procedure) could be adaptively changed (e.g., via broadcast signaling from the network device 101) according to different situations.

In an embodiment, the first set of PRACH preamble sequences for the first RA type and the second set of PRACH preamble sequences for the second RA type may partially or fully overlap. For example, a common/shared set of PRACH preamble sequences may be configured for the two-step RA procedure and the four-step RA procedure. In this case, the network device 101 is not able to identify a type of the RA procedure only from a detected preamble. Instead, the type of the RA procedure can be identified based on a resource used for transmitting the preamble by the terminal device, and/or whether a message following the preamble is detected.

It will be appreciated that the signal transmitted by the terminal device at block 510 may or may not be successfully detected by the network device 101. Accordingly, the terminal device 102 may or may not receive from the network device 101 a response indicating successful detection of the signal (including preamble and data).

Returning to FIG. 5A, at block 520, the terminal device 102 switches to an RA procedure of the second RA type different from the first RA type in response to an absence of a response from the network device 101 indicating successful detection of both the preamble portion and the information portion of the signal.

That is to say, according to embodiments of the present disclosure, the terminal device 102 is enabled to switch/fall back to an RA procedure of the second RA type in case the RA procedure of the first RA type fails. Such a solution increases not only flexibility of random access but also reliability of the random access procedure, without introducing extra delay.

Figure 5C:
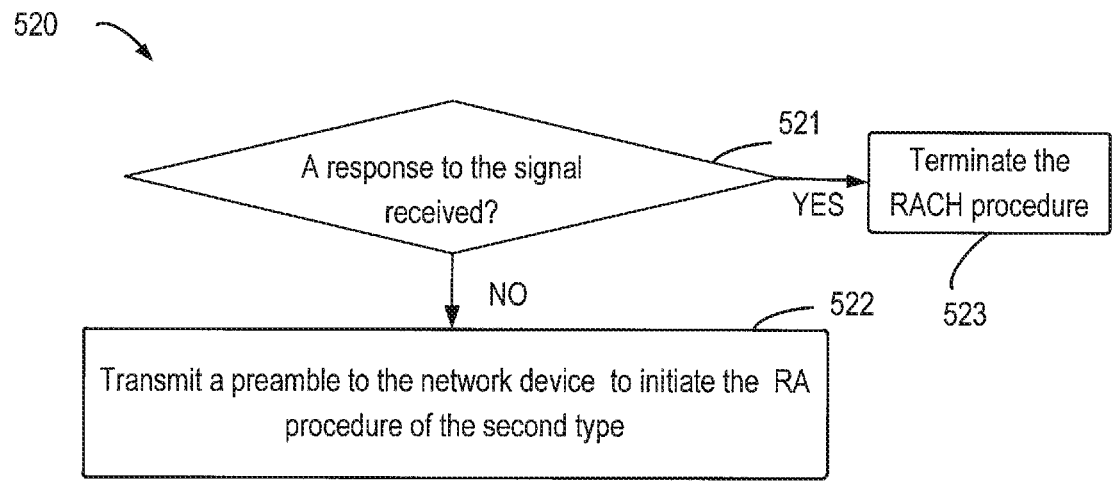

FIG. 5C illustrates an example implementation of block 520. At block 521, the terminal device 102 may determine whether a response to the signal is received from the network device 101.

At block 522, the terminal device 102 switches to the RA procedure of the second RA type if no response to the signal is received from the network device 101. For example, in response to an absence of a response to the signal from the network node, the terminal device 102 may switch/fall back to the RA procedure of the second RA type by transmitting a random access preamble to the network device 101 to initiate a random access procedure of the second RA type. Such a switching may be referred to as a terminal device initiated switching, since it does not require an indication for the switching from the network device 101.

On the other hand, if it is determined at block 521 that a response to the signal is received from the network device 101, the terminal device 102 may terminate the RACH procedure at block 523. Then data communication can be carried out between the network device 101 and the terminal device 102. Any suitable technologies, either currently known or to be developed in future, can be used to implement the actions at block 523.

Figure 5D:
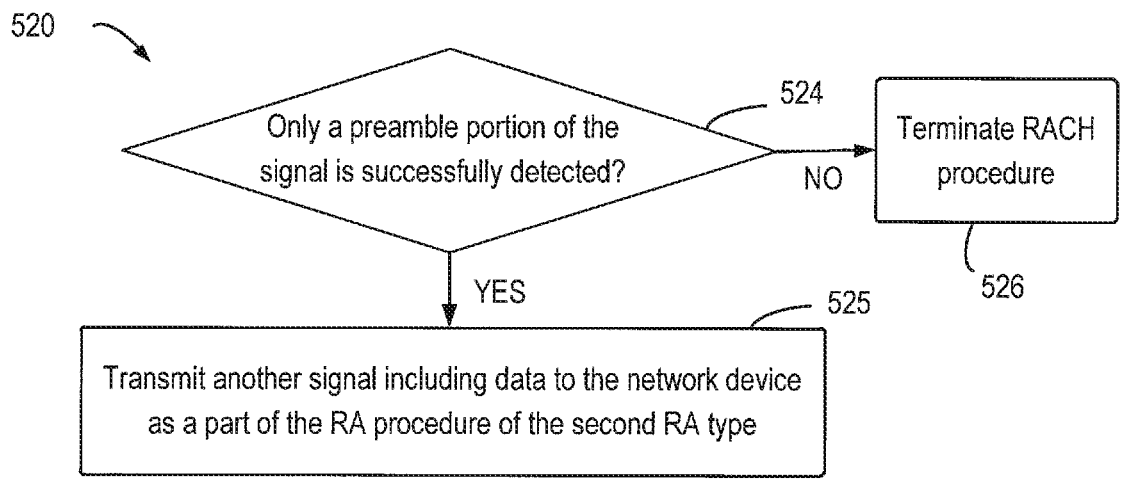

Alternatively, in another embodiment, the switching at block 520 may be initiated by the network device 101. That is, the terminal device 102 may determine whether to switch to the RA procedure of the second RA type based on the response/indication received from the terminal device 101. FIG. 5D illustrates such an example implementation.

As show in FIG. 5D, at block 524, the terminal device 102 determines from a received response as to whether only a preamble portion of the signal is successfully detected. Some example implementations of block 524 will be discussed later.

If it is determined, at block 524, from the received response that only the preamble portion of the signal is detected successfully by the network device 101, the terminal device 102 may switch/fall back to the RA procedure of the second RA type at block 525. In one embodiment, the terminal device 102 may switch/fall back to the RA procedure of the second RA type by transmitting a signal (such as a Msg 3 including an information portion as shown in FIG. 2) to the network device 101 as a part (e.g., a third step) of the random access procedure of the second RA type.

On the other hand, if it is determined at block 524 that the signal is fully detected successfully by the network device 101, the terminal device 102 may terminate the RACH procedure at block 526 so that data communication can be performed with the network device 101. Any suitable technologies, either currently known or to be developed in future, can be used to implement the actions at block 526.

Now some example implementations of block 524 will be discussed in detail. In some embodiments, the terminal device 102 may determine from the received response that only the preamble portion of the signal is detected successfully by the network device 101 in various manners. Just for illustration purpose, the terminal device 102 may Bete nine based on at least one of: an indicator included in the received response, an indicator included in a scheduling grant associated with the received response, a transmission format of the received response, a size of a resource granted by the received response, and a resource on which the response is received.

In one embodiment, the received response may include a detection result indicator to inform the terminal device a detection result at the network device side. For example, the detection result indicator may be set to "0" to denote success of partial detection (i.e., only the preamble portion is detected), or set to "1" to denote success of full detection (i.e., both the preamble portion and the information portion are detected successfully).

In another embodiment, the response received from the network device 101 may include a type indicator, which informs the terminal device 102 whether the response is for the first RA type, or for the second RA type. For example, the type indicator may be set to "0" to indicate the first RA type if the signal is fully detected, or set to "1" to indicate the second RA type if the signal is only partially detected. In this embodiment, the terminal device 102 may switch/fall back to the RA procedure of the second RA type if the type indicator included in the received response indicates the second RA type of an RA procedure.

In another embodiment, the type indicator or the detection result indicator may be included in a physical downlink control channel (PDCCH) downlink control information (DCI) associated with the response (for example, for scheduling the response).

In some embodiments, alternatively or in addition, the terminal device 102 may obtain the detection result indicator or the type indicator from the received response implicitly based on relevant factors. Examples of such factors include, but are not limited to, a transmission format of the received response, and/or a resource on which the response is received. For example, a response for a two-step RA procedure may be configured or specified to be transmitted with a first transmission format, while a response for a four-step RA procedure may be configured or specified to be transmitted with a different second transmission format. In this case, the terminal device 102 may interpret the transmission format of the received response as an implicit type indicator or detection result indicator.

Likewise, in an embodiment, a response for a two-step RA procedure may be configured or specified to be transmitted in a first time-frequency resource while a response for a four-step RA procedure may be configured or specified to be transmitted in a different second time-frequency resource. The terminal device 102 may identify a type of the response based on the resource where the response is received.

As another example, the terminal device 102 may identify a type of the response (or a detection result of the signal) based on a size of resource granted by the received response. For example, if the granted resource is small, the terminal device may consider it as a response for the RA procedure of the second RA type, and may switch/fall back to the RA procedure of the second RA type by transmitting an Msg 3 as shown in step 230 of FIG. 2. If the granted resource is large, the terminal device 102 may consider it as a response for the RA procedure of the first RA type and use the granted resource to perform following normal data transmission.

Still in reference to FIG. 5A, in some embodiments, at block 520, the terminal device 102 may perform the switching further based on a threshold. For example, the terminal device 102 may switch to the RA procedure of the second RA type further in response to the number of attempts for initiating an RA procedure of the first RA type exceeding a threshold. The threshold may be predefined and/or configured by the network device 101, for example.

Optionally, in some embodiments, the switching performed by the terminal device 102 at block 510 may be configured or controlled by the network device 101. In these embodiments, the method 500 may further includes a block 505 where the terminal device 102 receives, from the network device 101, information on a configuration of the switching. In these embodiments, at block 520, the terminal device 102 may perform the switching to the random access procedure of the second RA type according to the configuration received at block 505.

For illustration rather than limitation, in some embodiment, the configuration of the switching from the first RA type to the second RA type may indicate at least one of: whether the switching is supported or enabled, and a mode of the switching. Examples of the switching mode include, but are not limited to, a switching initiated by a terminal device or a switching initiated by a network device as described above.

In another embodiment, at block 505, the terminal device 102 may also receive other RACH related configuration including, but not limited to a radio resource for the RA procedure of the first RA type, a set of preambles for the RA procedure of the first RA type, a radio resource for a random access procedure of the second RA type, and/or a set of preambles for a random access procedure of the second RA type.

In some embodiments where the switching is initiated by the terminal device 102, a key idea is that a network device 101 (for example, a gNB of a NR system) makes the terminal device 102 know, in an implicit or explicit way, that a message 3 transmitted by the terminal device 102, which is configured with a two-step RA procedure, is not decoded successfully, that is, information carried in the message 3 is not extracted/recovered correctly. In this way, the terminal device 102 can fall back to a four-step RA procedure by sending a PRACH preamble again. As an example, in one embodiment, if a PRACH preamble from the terminal device 102 is detected while the message transmitted together with the preamble is not detected, the network device 101 makes no response to the terminal device 102 or just informs the terminal device 102 that the message is not decoded successfully. Accordingly, if the terminal device 102 does not receive RACH response (for example, within a given time window) or is informed that the two-step RA procedure failed, a new four-step RA procedure can be initiated.

Figure 7:
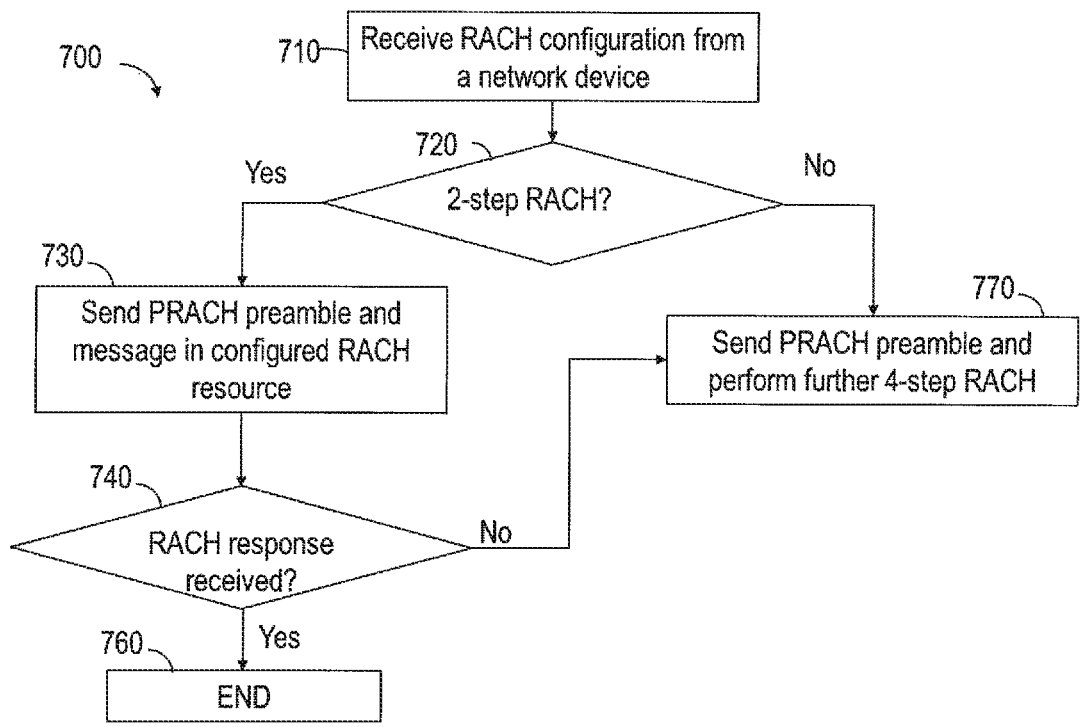
FIG. 7 illustrates a flowchart of another method implemented at a terminal device according to an embodiment of the present disclosure.

A schematic flowchart of a method 700 for a terminal device-initiated switching from a two-step RA procedure to a four-step RA procedure is shown in FIG. 7 as an example. As shown in FIG. 7, at block 710, the terminal device 102 may receive RACH configuration from a network device (e.g., the network device 101 shown in FIG. 1). It should be appreciated that the block 710 may be omitted in some embodiments where the RACH configuration may be predefined or determined by the terminal device implicitly.

At block 720, the terminal device 102 decides whether to perform a two-step RA procedure based on the received RACH configuration. If a two-step RACH procedure is not configured, at block 770, the terminal device 102 performs operations defined for the four-step RA procedure, for example the four-step RA procedure shown in FIG. 2.

If a two-step RA procedure is determined as being configured at block 720, at block 730, the terminal device 102 may send a PRACH preamble and a message using a configured RACH resource for the two-step RA. In an embodiment, the operation performed at block 730 may be similar to that described with reference to block 510 of FIG. 5A and thus will not be repeated herein.

At block 740, the terminal device 102 monitors a response from the network device 101. If it is determined at block 740 that the response is received, the terminal device 102 may terminate the two-step RA procedure at block 760 and then performs communication with the network device 101 using the resource assigned in the response.

On the other hand, if it is determined at block 740 that no response is received, the terminal device 102 may switch/fall back to the four-step RA procedure at block 770. The operation of switching to block 770 may be similar to that described with reference to block 520 of FIGS. 5A and 5C. For example, the terminal device 102 may switch to the four-step RA procedure by sending a preamble to the network device 101 and then performing other operation defined for the four-step RA procedure. It is to be understood that in this example, a response and a DCI associated with the response monitored by the terminal device 102 at block 740 may not include the detection result indicator or the type indicator as described with reference to method 500.

Figure 8:
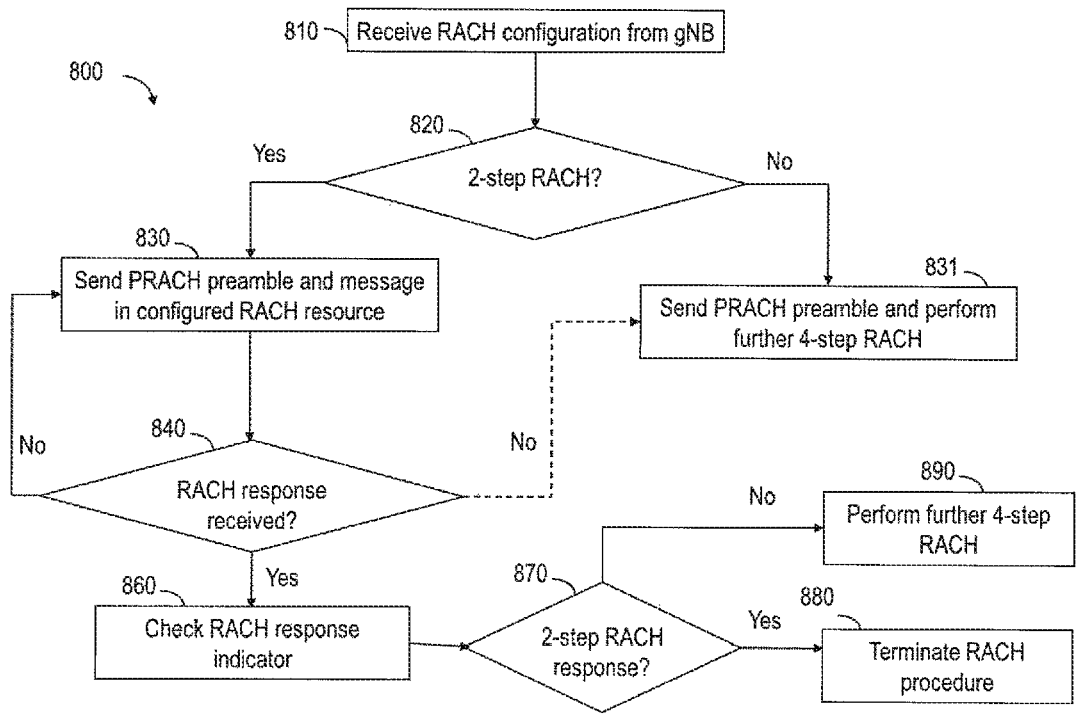
FIG. 8 illustrates flowcharts of still another method implemented at a terminal device according to an embodiment of the present disclosure.

FIG. 8 shows a schematic flowchart of a method 800 for the switching from a two-step RA procedure to a four-step RA procedure initiated by the network device 101. Operations of blocks 810, 820, 830, 840 and 831 may be same as that of blocks 710, 720, 730, 740 and 770 of FIG. 7, respectively, and thus will not be repeated herein.

If it is determined at block 840 that the response is received, at block 860, the terminal device 102 may further check an RACH response indicator which may be included in the RACH response or included in a DCI associated with the received response. The indicator may be a detection result indicator or a type indicator as described with reference to method 500.

At block 870, the terminal device 102 determines whether the response is a two-step RA response, or in other words, whether the response is for a two-step RA procedure. If the response is a two-step RA response which means both the preamble and the message transmitted by the terminal device 102 at block 830 are successfully detected by the network device 101, at block 880, the terminal device 102 terminates the two-step RA procedure at block 880 and then performs communication with the network device 101 using the resource assigned in the response.

On the other hand, if the response is not a two-step RACH response, at block 890, the terminal device 102 may switch/fall back to a four-step RA procedure. For example, the terminal device 102 may perform action at 230 shown in FIG. 2. Specifically, at block 890, the terminal device 102 does not necessarily have to perform the four-step RA procedure from 210 of FIG. 2 since the response from the network device 101 has already been received at block 840. This means that the preamble portion transmitted by the terminal device 102 at block 830 is already detected successfully by the network device 101. By starting the four-step RA procedure from 230, the access latency can be reduced.

As shown in FIG. 8, in the case that no response is received at block 840, there are two possible subsequent actions. In some embodiments, the terminal device 102 may return to block 830 to initiate a new two-step RA procedure in the absence of the response from the network device 101. Alternatively, in other embodiments, the terminal device 102 may switch/fall back to the four step RA procedure at block 831 if no response is received from the network device 101. The switching to block 831 may be similar to the switching from block 740 to block 770 as shown in FIG. 7. This operation may be considered a terminal device-initiated switching.

That is to say, in some embodiment, the terminal device-initiated switching and network device-initiated switching can be combined. In one embodiment, the terminal device-initiated switching (e.g., switching to 831 from 840 shown in FIG. 8) may be disabled or enabled by the network device 101 via signaling. The signaling may include one of a broadcast signaling or a dedicated signaling. In another embodiment, the terminal device 102 may how to react in the absence of response (block 830 or 831) based on a threshold. For example, if the number of access attempts with power ramping of the terminal device 102 exceeds a threshold, the terminal device 102 may proceed to block 831 if no response is detected at block 840; otherwise, the method 800 may return to block 830 from block 840. In another embodiment, if it is determined at block 840 that no RACH response is received from the network device 101, the terminal device 102 may perform the actions at block 830 or 831 on a random basis.

Figure 9A:
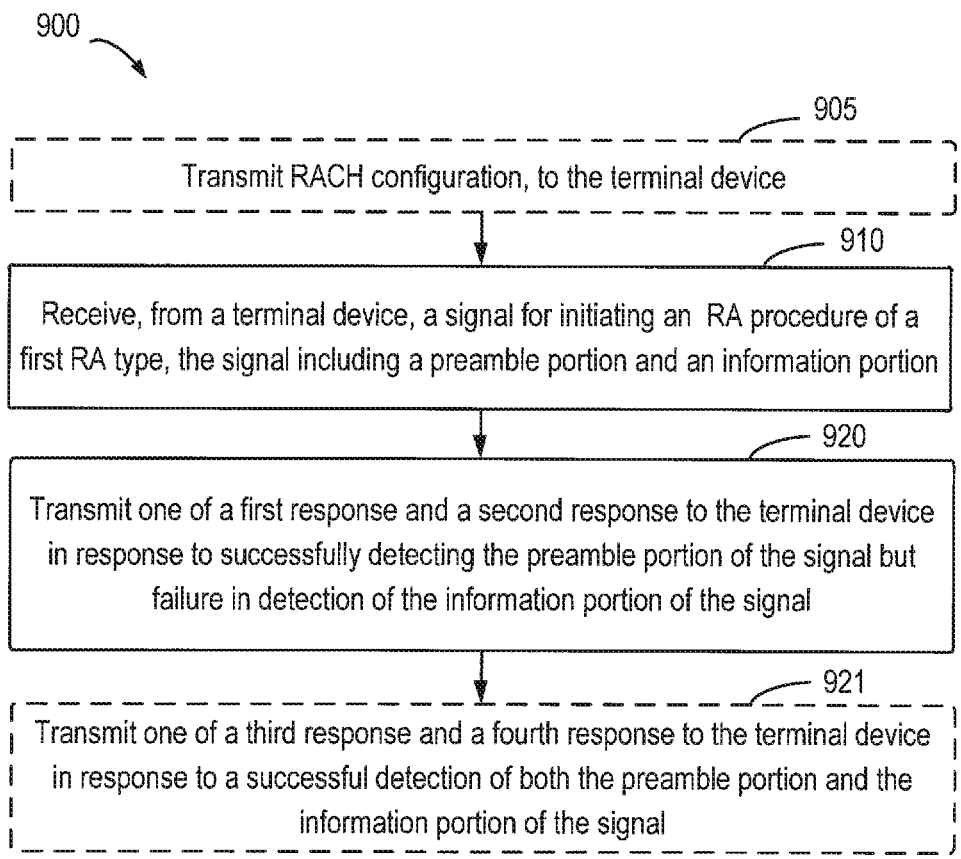
FIGS. 9A-9C illustrates flowcharts of a method implemented at a network device according to an embodiment of the present disclosure.

Reference is now made to FIG. 9A which shows a flowchart of a method 900 implemented in a network device. For simplicity, the method 900 will be described below with reference to the network device 101 shown in FIG. 1. However, it would be appreciated that the method 900 could also be implemented by any other network device.

As illustrated in FIG. 9A, at block 910, the network device 101 receives, from a terminal device 102, a signal for initiating an RA procedure of a first RA type, the signal including a preamble portion and an information portion. In one embodiment, the first RA type may include a two-step RA, for example the two-step RA schematically shown in FIG. 4, but embodiments are not limited thereto. In another embodiment, the RA procedure of the first RA type may involve more or less or different operation than that shown in FIG. 4.

There may be various ways for the network device 101 to determine that the signal it receives at block 910 is associated with the first RA type. In one embodiment, separate resources may be configured or specified for transmission of a preamble of the first RA type and transmission of a preamble of a second RA type, as shown in FIG. 6B. In this case, an example implementation of block 910 is shown in FIG. 9B.

Figure 9B:
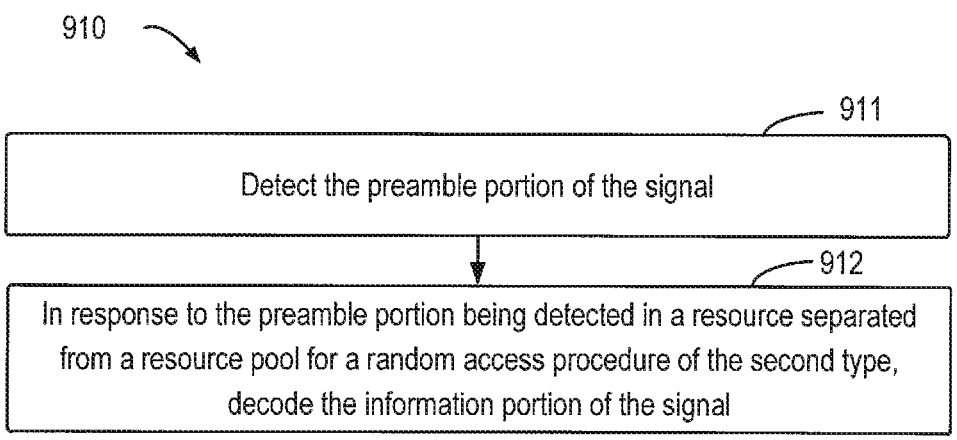

As shown in FIG. 9B, at block 911, the network device 101 may detect the preamble portion of the signal at block 911. If the preamble portion of the signal is detected in a resource separate from a resource pool associated with the second RA type, at block 912, the network device 101 may decode the information portion of the signal to extract/recover the information carried therein.

In another embodiment, resources configured or specified for transmission of a preamble of the first RA type may partially or fully overlap with the resource configured/specified for transmission of a preamble of a second RA type, as shown in FIG. 6A. In this case, the preamble of the signal may be transmitted in a resource (for example resource 610 shown in FIG. 6A) overlapping with the resource associated with second RA type, and the information portion of the signal may be transmitted in a resource (for example resource 612 shown in FIG. 6A) separate from the resource associated with the second RA type. In this embodiment, in order for the network device 101 to identify a type of an RA procedure, different preamble formats (for example, different sequences, and/or cyclic shifts for the preambles) may be configured for the first RA type (for example, two-step RA) and the second RA type (for example, four-step RA) respectively. An example implementation of block 910 in this case is shown in FIG. 9C.

Figure 9C:
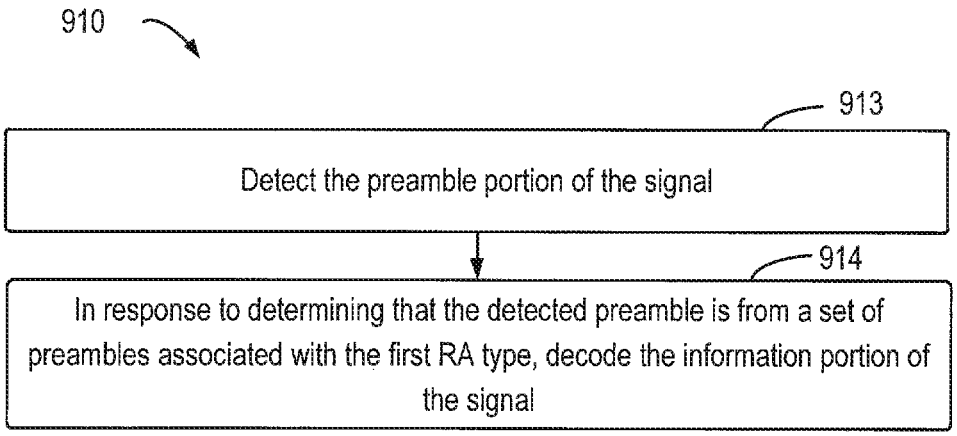

As shown in FIG. 9C, the network device 101 may detect the preamble portion of the signal at block 913. If the detected preamble is from a set of preambles associated with the first RA type, the network device 101 may decode the information portion of the signal at block 914. It should be appreciated that the procedure shown in FIG. 9C may be performed also in an embodiment where separate resources are configured for the first RA type and the second RA type.

As discussed with FIG. 4, since the signal may be transmitted by the terminal device 102 without a TA adjustment, the information portion may not be detected successfully at the network device 101. In this case, with method 900, the network device 101 may trigger the terminal device 102 to switch/fall back to an RA procedure of a second RA type (for example, a four-step RA procedure) different from the first RA type to increase reliability of the random access.

Referring back to FIG. 9A, at block 920, in response to successfully detecting the preamble portion of the signal but failure in detection of the information portion of the signal (also referred to as partial successful detection herein), the network device 101 transmits one of the following to the terminal device: a first response indicating a successful detection of only a preamble portion of the signal, and a second response indicating an RA procedure of the second RA type different from the first RA type.

In one embodiment, at block 920, the network device 101 may transmit the first response indicating the successful detection of only a preamble portion of the signal without a successful detection of the information portion of the signal by including an explicit indicator (for example, a detection result indicator) in the first response transmitted. In another embodiment, the network device 101 may transmit the first response indicating the successful detection of only a preamble portion of the signal without a successful detection of the information portion of the signal by including the explicit indicator in a scheduling grant (for example a DCI) associated with the first response transmitted. In still another embodiment, the first response may indicate the partial successful detection implicitly by at least one of: a transmission format of the first response, a size of a resource granted by the first response, and a resource on which the first response is received. The second response may indicate an RA type explicitly or implicitly in a similar way.

In some optional embodiments, the method 900 may include block 921. At block 921, if both the preamble portion and the information portion of the signal are successfully detected, the network device 101 may transmit one of the following to the terminal device: a third response indicating a successful detection of the signal, and a fourth response indicating an RA procedure of the first RA type. It should be appreciated that in another embodiment, when both the preamble portion and the information portion of the signal are detected successfully, the network device 101 may not transmit a type indicator or a detection result indicator in the third response or the fourth response. That is, a normal 2-step RA response as shown in FIG. 4 may be transmitted.

In some embodiments, configuration of the RACH procedure or a part of the configuration may be signaled from the network device to a terminal device. For example, as shown in FIG. 9A, the method 900 may optionally include block 905 where the network device 101 may transmit RACH configuration information to the terminal device 102.

For example, the RACH configuration information may indicate at least one of the following to the terminal device 102: a radio resource for the RA procedure of the first RA type, a set of preambles for the RA procedure of the first RA type, a radio resource for a random access procedure of the second RA type, a set of preambles for a random access procedure of the second RA type, a configuration on a switching from the RA procedure of the first RA type to an RA procedure of the second RA type.

In another embodiment, the configuration on a switching from the RA procedure of the first RA type to an RA procedure of the second RA type may indicate at least one of: whether the switching is supported or enabled, and a mode of the switching. The mode of the switching may include but not limited to one of a switching initiated by a terminal device, a switching initiated by a network device.

It should be appreciated that in some embodiments, all or some configuration of the RACH procedure may be predefined or can be known by the terminal device implicitly, and in this case block 905 of method 900 may be omitted.

Figure 10A:
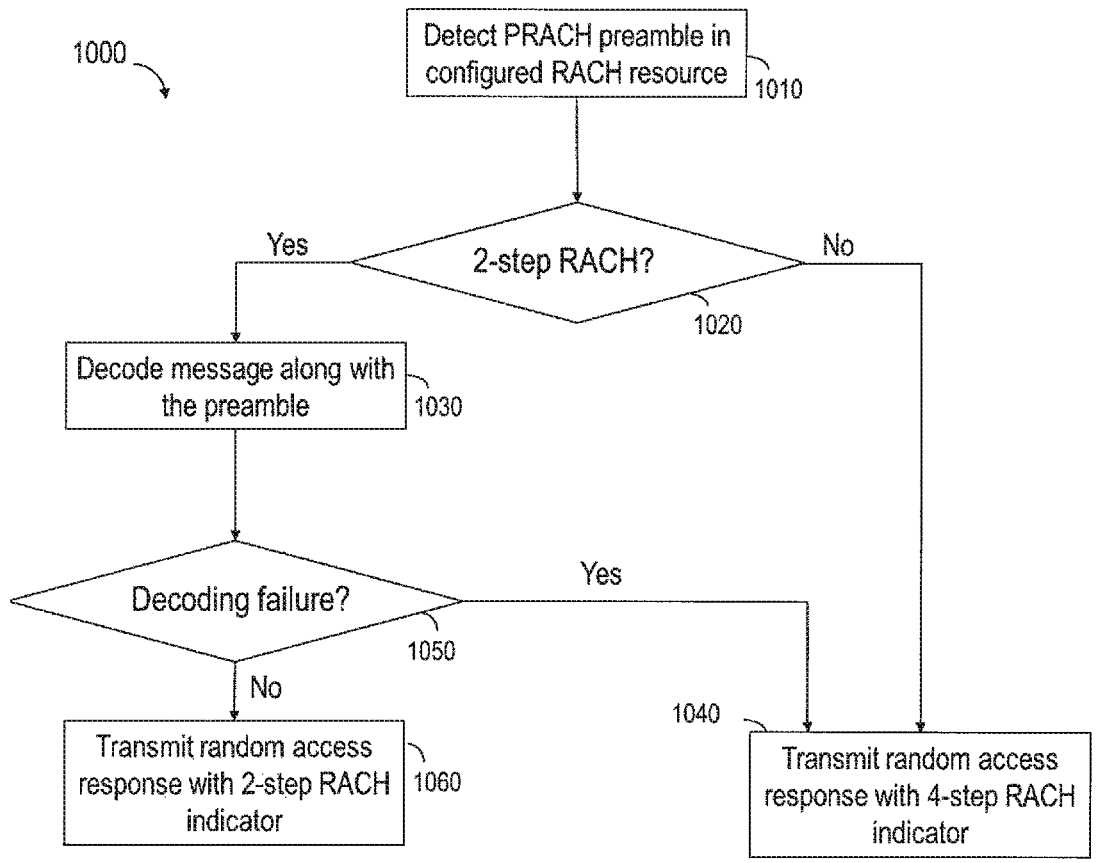
FIGS. 10A-10B illustrates flowcharts of some other methods implemented at a network device according to embodiments of the present disclosure.
Figure 10B:
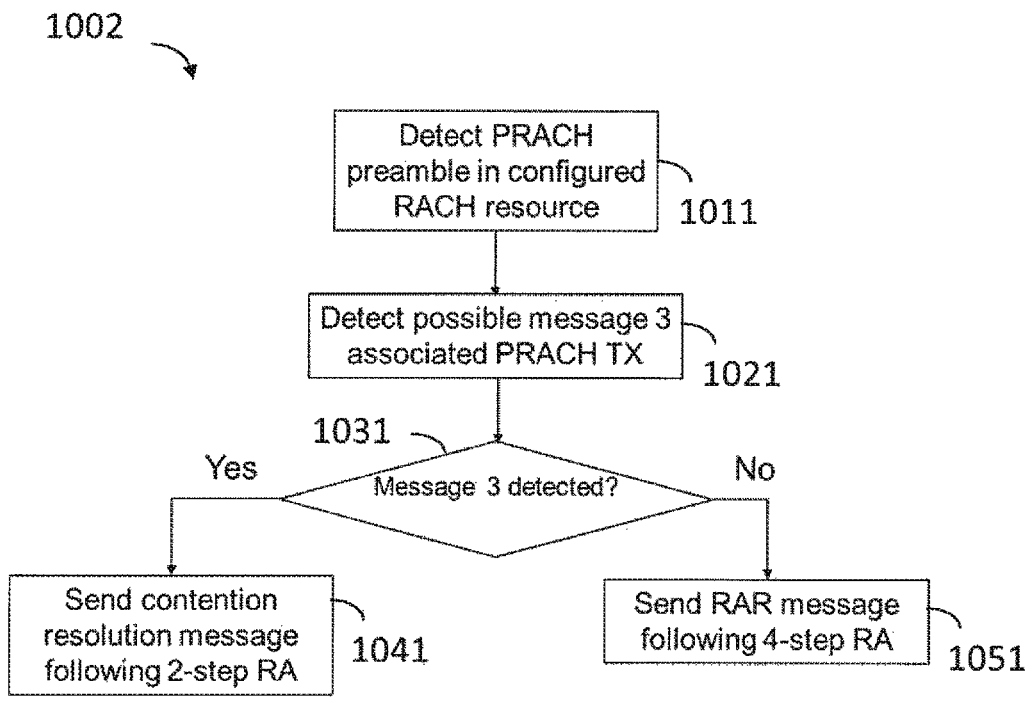

The implicit or explicit indication of detection result or RA type via the first response or second response transmitted by the network device 101 at block 910 of FIG. 9A enables a network device-initiated switching of RA type. Some examples of the network device-initiated RA type switching procedure are illustrated in FIGS. 10A-10B. FIG. 10A shows the flowchart an example method 1000 of network device-initiated RA type switching from a two-step RA to a four-step RA performed at the network device 101 side in a scenario where the two-step RA type and the four-step RA type may be identified based on resource and/or preamble partition.

In this example, at block 1010, the network device 101 detects a preamble in a configured RACH resource, and the operation may be same as that described with reference 910, 911 or 913 shown in FIGS. 9A-9C.

At block 1020, the network device 101 determines whether current RA procedure is a two-step RA based on the detected preamble (for example, based on sequence and/or resource of the preamble).

If the RA procedure is a two-step RA, at block 1030, the network device 101 decodes a message transmitted together with the preamble, and the operation may be same as that of block 912 or 914 shown in FIGS. 9B-9C.

If the RA procedure is not a two-step RA, at block 1040, the network device 101 may transmit a response to the terminal device. In one embodiment, the response transmitted at block 1040 may be same as a conventional four-step RAR transmitted at block 220 of FIG. 2. In another embodiment, the response transmitted at block 1040 or a scheduling DCI associated with the response may include a type indicator indicating a four-step RA, or a detection result indicator indicating partial detection success (i.e., only preamble is detected).

As shown in FIG. 10A, at block 1050, the network device 101 checks whether decoding of the message fails, for example by performing CRC. If the decoding succeeds, at block 1060, the network device 101 transmits a two-step RA response to the terminal device, and the response may include a type indicator indicating an RA procedure of a two-step RA type, or include a detection result indicator indicating detection success of the full signal (i.e., both preamble and data are detected).

In another embodiment, the type indicator or detection result indicator may be transmitted by the network device 101 in a scheduling grant (for example, DCI) associated with the response. The type indicator included in the response transmitted at block 1060 (and 1040) enables the terminal device 102 to perform a network device-initiated RA type switching procedure, for example the procedure described with reference to FIG. 8.

On the other hand, if it is determined at block 1050 that the decoding fails, the network device 101 may perform the operations of block 1040 as described above. Alternatively, in another embodiment, if the decoding of the message portion fails at block 1050, the network device 101 may not transmit an RACH response to the terminal device 102. In still another embodiment, the network device 101 may inform the terminal device about the decoding failure.

FIG. 10B provides another example method 1002 of network device-initiated RA type switching from a two-step RA to a four-step RA performed at the network device 101 side in a scenario where the first RA type and the second RA type may not be identified based on resource or preamble partition. In this example, at block 1011, the network device 101 detects a preamble in a configured RACH resource (for example, a common/shared resource configured for the two-step RA and the four-step RA), and the detection operation may be same as that described with reference block 1010 of FIG. 10A.

After the preamble detection at block 1011, the network device 101 is not aware of a type of the RA procedure yet. At block 1021, the network device 101 attempts to blindly detect an Msg3 that is possibly transmitted together with the preamble. At block 1031, the network device 101 checks whether the Msg3 is detected.

In response to the Msg3 being detected, at block 1041, the network device 101 transmits a two-step RA response to the terminal device, and the response may include a type indicator or a detection result indicator indicating detection success of the full signal (i.e., both preamble and data are detected). In another embodiment, the type indicator or detection result indicator may be transmitted by the network device 101 in a scheduling grant (for example, a DCI) associated with the response. If the Msg3 is not detected, the network device 102 performs the operation of block 1051. The operation of block 1051 may be similar to that of block 1040 in FIG. 10A. It should be appreciated that embodiments are not limited to the examples explicitly illustrated herein.

In some embodiments, it would be beneficial that a network device (for example a gNB in a NR system) may switch to a four-step RA procedure immediately when it detected a failure of a two-step RA procedure. However, the embodiments may also be extended to support switching between other types of RA procedures.

In an embodiment, in order to allow a terminal device 102 to know whether a response from the network device 101 is a two-step or four-step RA response explicitly, one indicator (for example a detection result indicator or a type indicator) may be included in a DCI associated with the response or included as part of payload of the RA response. For example, a gNB of a NR system may determine to fall back to a four-step RA procedure immediately when a message following a preamble is not decoded. The gNB may fall back to the four-step RA procedure by sending an RA response with a four-step RA indicator. However, it should be appreciated that in another embodiment (e.g., in a scenario supporting terminal device-initiated RA type switching), the indicator may not be transmitted.

In some embodiments, the terminal device 102 configured with a two-step RA procedure is allowed to identify if a response is a two-step or four-step RA response in various ways. For example, the terminal device 102 may identify a type of the response explicitly by checking an indicator included in the RA response or an indicator included in a DCI associated with the response.

As another example, the terminal device 102 may identify the type of the response implicitly by blindly decoding the RACH response using both a two-step RA response format and a four-step RA response format. For example, the terminal device 102 may first use a two-step RA response format for detection and then use a four-step RA response format if the former detection fails.

In another embodiment, the terminal device 102 may identify a type of the response by a granted resource size. In some embodiments, the terminal device 102 may be pre-configured in such a way that the RAR (a four-step RA response) and contention resolution message (a two-step RA response) are scheduled to different time-frequency resource range in frequency domain. In this event, the terminal device 101 may determine whether the received response is an RAR or a contention resolution message based on the radio resource used by the received message.

Figure 11:
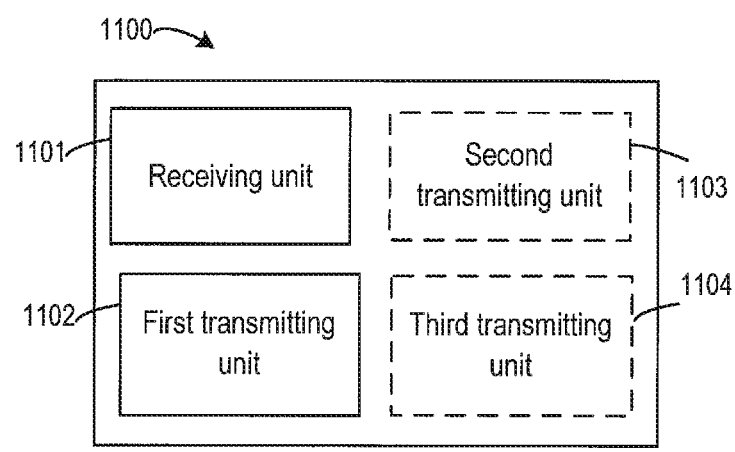
FIG. 11 illustrates a schematic block diagram of an apparatus implemented as/in a network device according to an embodiment of the present disclosure.

FIG. 11 illustrates a schematic block diagram of an apparatus 1100 in a wireless communication network (e.g., the wireless communication network 100 shown in FIG. 1). The apparatus may be implemented as/in a network device, e.g., the network device 101 shown in FIG. 1. The apparatus 1100 is operable to carry out the example method 900, 1000 or 1002 described with reference to FIGS. 9A-9C, 10A-10B and possibly any other processes or methods. It is also to be understood that the method 900, 1000 or 1002 is not necessarily carried out by the apparatus 1100. At least some steps of the method 900, 1000 or 1002 can be performed by one or more other entities.

As illustrated in FIG. 11, the apparatus 1100 includes a receiving unit 1101 and a first transmitting unit 1102. The receiving unit 1101 is configured for receiving, from a terminal device, a signal for initiating a first random access, RA, procedure of a first RA type, the signal including a preamble portion and an information portion; and the first transmitting unit 1102 is configured for transmitting one of the following to the terminal device in response to successfully detecting the preamble portion of the signal but failure in detection of the information portion of the signal: a first response indicating a successful detection of only a preamble portion of the signal, and a second response indicating an RA procedure of a second RA type different from the first RA type. In one embodiment, the first RA type may include, but not limited to, a two-step RA, and the second RA type may include, but not limited to, a four-step RA.

In another embodiment, the apparatus 1100 may include a second transmitting unit 1103 configured to transmit one of the following to the terminal device in response to a successful detection of both the preamble portion and the information portion of the signal: a third response indicating a successful detection of the signal, and a fourth response indicating an RA procedure of the first RA type.

In still another embodiment, the apparatus 1100 may include a third transmitting unit 1104 configured to transmit RACH configuration information to the terminal device, and the RACH configuration information may indicate at least one of the following: a radio resource for the RA procedure of the first RA type, a set of preambles for the RA procedure of the first RA type, a radio resource for a random access procedure of the second RA type, a set of preambles for a random access procedure of the second RA type, and a configuration on a switching from the RA procedure of the first RA type to an RA procedure of the second RA type.

In some embodiments, the receiving unit 1101, the first transmitting unit 1102, the second transmitting unit 1103, and the third transmitting unit 1104 may be configured to perform the operations of blocks 910, 920, 921 and 905 of FIGS. 9A-9C respectively, and therefore descriptions provided with reference to FIGS. 9A-9C also apply here and details will not be repeated.

Figure 12:
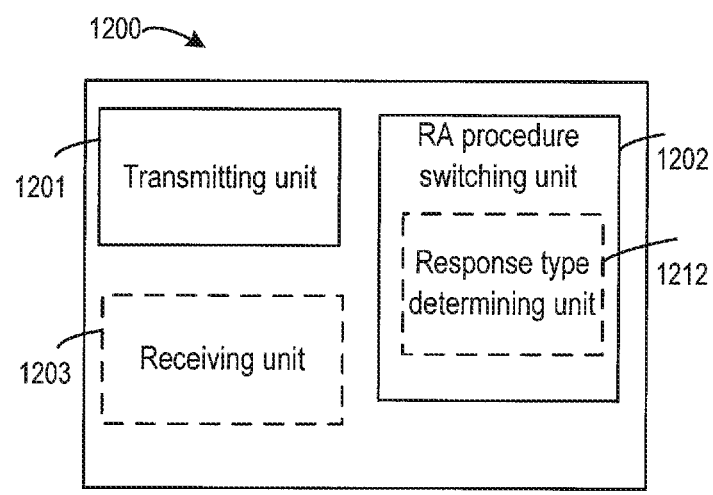
FIG. 12 illustrates a schematic block diagram of an apparatus 1000 implemented as/in a terminal device according to an embodiment of the present disclosure.

FIG. 12 illustrates a schematic block diagram of an apparatus 1200 in a wireless communication network (e.g., the wireless communication network 100 shown in FIG. 1). The apparatus 1200 may be implemented as/in a terminal device, e.g., any of the terminal devices 102-104 shown in FIG. 1 in communication with the network device 101 or the apparatus 1100. The apparatus 1200 is operable to carry out the example method 500, 700 or 800 described with reference to FIGS. 5A-5D, 7 or 8 and possibly any other processes or methods. It is also to be understood that the method 500, 700 or 800 is not necessarily carried out by the apparatus 1200. At least some steps of the method 500, 700 or 800 can be performed by one or more other entities.

As illustrated, the apparatus 1200 includes a transmitting unit 1201, an RA procedure switching unit 1202. The transmitting unit 1201 is configured to transmit a signal to a network device 101 to initiate a first random access, RA, procedure of a first RA type, the signal including a preamble portion and an information portion; and the RA procedure switching unit 1202 is configured to switch to an RA procedure of the second RA type of a second RA type different from the first RA type in response to an absence of a response from the network device 101 indicating a successful detection of both the preamble portion and the information portion of the signal.

In an embodiment, the RA procedure switching unit 1202 may include a response type determining unit 1212 configured to determine as to whether only a preamble portion of the signal is successfully detected, for example, based on at least one of: an indicator included in the received response, an indicator included in a scheduling grant associated with the received response, a transmission format of the received response, a size of a resource granted by the received response, and a resource on which the response is received.

In another embodiment, the apparatus 1200 may optionally include a receiving unit 1203 configured to receive, from the network device 101, RACH configuration information. The RACH configuration information may include at least one of: a radio resource for the RA procedure of the first RA type, a set of preambles for the RA procedure of the first RA type, a radio resource for a random access procedure of the second RA type, a set of preambles for a random access procedure of the second RA type, and a configuration on a switching from the RA procedure of the first RA type to an RA procedure of the second RA type on a configuration of the switching from RA procedure to the RA procedure of the second RA type. In an embodiment, the information on the configuration of switching may indicates at least one of: whether the switching is supported/enabled, and a mode of the switching. In another embodiment, the mode of the switching may include but not limited to one of: a switching initiated by the terminal device, and a switching initiated by the network device.

In some embodiments, the transmitting unit 1201, the RA procedure switching unit 1202, and the receiving unit 1203 may be configured to perform the operations of blocks 510, 520, and 505 of FIGS. 5A-5D respectively, and therefore descriptions provided with reference to FIGS. 5A-5D also apply here and details will not be repeated.

Figure 13:
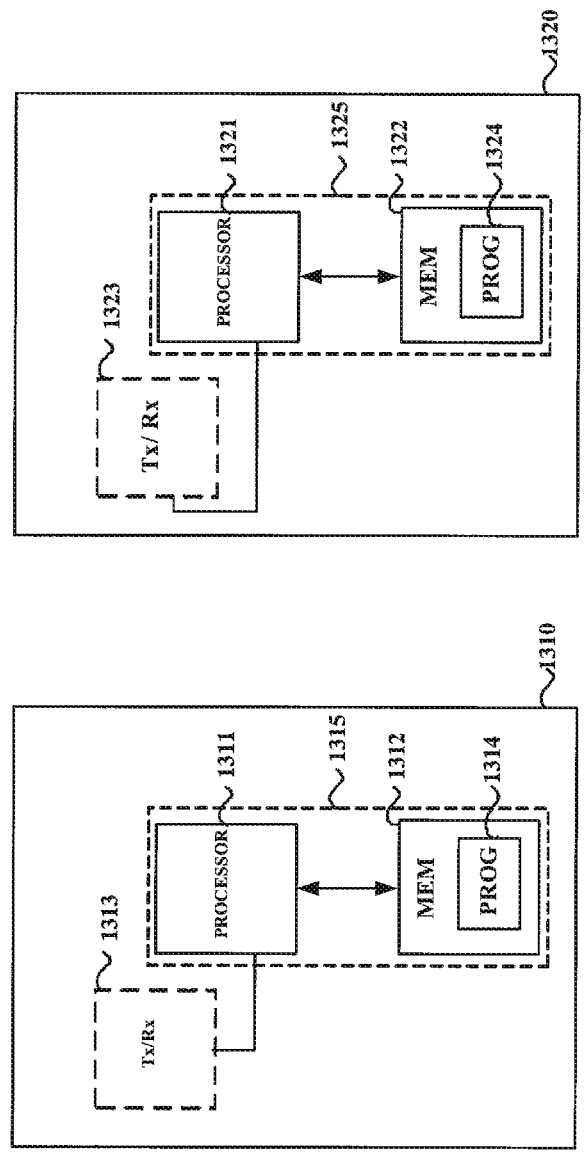
FIG. 13 illustrates a simplified block diagram of an apparatus that may be embodied as/in a network device, and an apparatus that may be embodied as/in a terminal device.

FIG. 13 illustrates a simplified block diagram of an apparatus 1310 that may be embodied in/as a network device, e.g., the network device 101 shown in FIG. 1, and an apparatus 1320 that may be embodied in/as a terminal device, e.g., one of the terminal devices 102-104 shown in FIG. 1.

The apparatus 1310 may include one or more processors 1311, such as a data processor (DP) and one or more memorys (MEM) 1312 coupled to the processor 1311. The apparatus 1310 may further include a transmitter TX and receiver RX 1313 coupled to the processor 1311. The MEM 1312 may be non-transitory machine readable storage medium and it may store a program (PROG) 1314. The PROG 1314 may include instructions that, when executed on the associated processor 1111, enable the apparatus 1310 to operate in accordance with the embodiments of the present disclosure, for example to perform the method 900, 1000 or 1002. A combination of the one or more processors 1311 and the one or more MEMs 1312 may form processing means 1315 adapted to implement various embodiments of the present disclosure.

The apparatus 1320 includes one or more processors 1321, such as a DP, and one or more MEMs 1322 coupled to the processor 1321. The apparatus 1320 may further include a suitable TX/RX 1323 coupled to the processor 1321. The MEM 1322 may be non-transitory machine readable storage medium and it may store a PROG 1324. The PROG 1324 may include instructions that, when executed on the associated processor 1321, enable the apparatus 1320 to operate in accordance with the embodiments of the present disclosure, for example to perform the method 500, 700 or 800. A combination of the one or more processors 1321 and the one or more MEMs 1322 may form processing means 1325 adapted to implement various embodiments of the present disclosure.

Various embodiments of the present disclosure may be implemented by computer program executable by one or more of the processors 1311 and 1321, software, firmware, hardware or in a combination thereof.

The MEMs 1312 and 1322 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 1311 and 1321 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless system operating in a shared frequency band (e.g., an unlicensed band), it should not be construed as limiting the spirit and scope of the present disclosure. The principle and concept of the present disclosure may be more generally applicable to other scenarios.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented in a network device, comprising:
   receiving, from a terminal device, a signal for initiating a random access (RA) procedure of a first RA type, the signal including a preamble portion and an information portion for initiating the RA procedure of the first RA type, wherein the preamble portion includes a preamble for initiating the RA procedure of the first RA type and a preamble for initiating a RA procedure of a second RA type;
   in response to successfully detecting the preamble portion and the information portion of the signal, transmitting a response to the terminal device to use the RA procedure of the first RA type; and
   in response to successfully detecting the preamble portion of the signal but failure in detection of the information portion of the signal, transmitting a response to the terminal device indicating a successful detection of only the preamble portion, in order for the terminal device to switch to the second RA type to continue establishing a RA of the second RA type with the network device without resending the preamble for initiating the RA procedure of the second RA type, wherein the second RA type takes more steps to establish a RA with the network device than the first RA type.

2. The method according to claim 1, wherein:
   the first RA type includes a two-step RA, and
   the second RA type includes a four-step RA.

3. The method according to claim 1, wherein the receiving the signal for initiating the RA procedure of the first RA type comprises:
   detecting the preamble portion of the signal; and
   in response that the preamble for initiating the RA procedure of the first RA type in the detected preamble portion is from a set of preambles associated with the first RA type, decoding the information portion of the signal.

4. The method according to claim 1, further comprising:
   transmitting, to the terminal device, information indicating one or more of:
   a radio resource for the RA procedure of the first RA type;
   a set of preambles for the RA procedure of the first RA type;
   a radio resource for the RA procedure of the second RA type;
   a set of preambles for the RA procedure of the second RA type; and
   a configuration on a switching from the RA procedure of the first RA type to the RA procedure of the second RA type.

5. A method implemented in a terminal device for random access, comprising:
   transmitting a signal to a network device to initiate a random access (RA) procedure of a first RA type, the signal including a preamble portion and an information portion for initiating the RA procedure of the first RA type, wherein the preamble portion includes a preamble for initiating the RA procedure of the first RA type and a preamble for initiating a RA procedure of a second RA type, wherein in response to successfully detecting the preamble portion and the information portion of the signal, the network device transmits a response to use the RA procedure of the first RA type or in response to successfully detecting the preamble portion of the signal but failure in detection of the information portion of the signal, the network device transmits a response indicating a successful detection of only the preamble portion, in order for the terminal device to select between the RA procedure of the first RA type and the RA procedure of the second RA type, wherein the second RA type takes more steps to establish a RA with the network device than the first RA type; and
   in response to receiving an indication from the network device of the successful detection of only the preamble portion of the signal, switching to the RA procedure of the second RA type to continue establishing a RA of the second RA type with the network device without resending the preamble for initiating the RA procedure of the second RA type to the network device.

6. The method according to claim 5, wherein:
   the first RA type includes a two-step RA, and
   the second RA type includes a four-step RA.

7. The method according to claim 5, wherein the switching to the RA procedure of the second RA type in response to the indication from the network device comprises:
   transmitting another signal including an information portion to the network device as part of the RA procedure of the second RA type.

8. The method according to claim 7, wherein the indication is based on one or more of:
- an indicator included in a response from the network device,
- an indicator included in a scheduling grant associated with a response from the network device,
- a transmission format of a response from the network device,
- a size of a resource granted by a response from the network device, and
- a resource on which a response is received from the network device.

9. The method according to claim 5, wherein the switching to the RA procedure of the second RA type comprises:
switching to the RA procedure of the second RA type further in response to a number of attempts for initiating the RA procedure of the first RA type exceeding a threshold.

10. The method according to claim 5, further comprising:
receiving, from the network device, information on a configuration of the switching from the RA procedure of the first type to the RA procedure of the second RA type; and
wherein the switching to the RA procedure of the second RA type comprises:
switching to the RA procedure of the second RA type according to the configuration.

11. An apparatus in a network device, the apparatus comprising:
a processor; and
a memory, said memory containing instructions which, when executed by said processor, instruct said apparatus to perform operations to:
receive, from a terminal device, a signal for initiating a first random access (RA) procedure of a first RA type, the signal including a preamble portion and an information portion for initiating the RA procedure of the first RA type, wherein the preamble portion includes a preamble for initiating the RA procedure of the first RA type and a preamble for initiating a RA procedure of a second RA type;
in response to successfully detecting the preamble portion and the information portion of the signal, transmit a response for to the terminal device to use the RA procedure of the first RA type; and
in response to successfully detecting the preamble portion of the signal but failure in detection of the information portion of the signal, transmit a response to the terminal device indicating a successful detection of only the preamble portion, in order for the terminal device to switch to the second RA type to continue to establish a RA of the second RA type with the network device without resending the preamble for initiating the RA procedure of the second RA type, wherein the second RA type takes more steps to establish a RA with the network device than the first RA type.

12. The apparatus according to claim 11, wherein the instructions further instruct said apparatus to receive the signal by performing operations to:
detect the preamble for initiating the RA procedure of the first RA type from a set of preambles associated with the first RA type.

13. An apparatus in a terminal device, the apparatus comprising:
a processor; and
a memory, said memory containing instructions which, when executed by said processor, instruct said apparatus to perform operations to:
transmit a signal to a network device to initiate a first random access (RA) procedure of a first RA type, the signal including a preamble portion and an information portion for initiating the RA procedure of the first RA type, wherein the preamble portion includes a preamble for initiating the RA procedure of the first RA type and a preamble for initiating a RA procedure of a second RA type wherein in response to successfully detecting the preamble portion and the information portion of the signal, the network device transmits a response to use the RA procedure of the first RA type or in response to successfully detecting the preamble portion of the signal but failure in detection of the information portion of the signal, the network device transmits a response indicating a successful detection of only the preamble portion, in order for the terminal device to select between the RA procedure of the first RA type and the RA procedure of the second RA type, wherein the second RA type takes more steps to establish a RA with the network device than the first RA type; and
in response to receiving an indication from the network device of the successful detection of only the preamble portion of the signal, switch to the RA procedure of the second RA type to continue establishing a RA of the second RA type with the network device without resending the preamble for initiating the RA procedure of the second RA type to the network device.

14. The apparatus according to claim 13, wherein:
the first RA type includes a two-step RA, and
the second RA type includes a four-step RA.

15. The apparatus according to claim 13, wherein the instructions further instruct said apparatus to switch to the RA procedure of the second RA type in response to the indication from the network device by performing operations to:
transmit another signal including data to the network device as part of the RA procedure of the second RA type.

* * * * *